United States Patent

Noxon

[15] 3,650,627
[45] Mar. 21, 1972

[54] MEASUREMENT OF VISUAL RANGE IN FOG

[72] Inventor: Paul Adelbert Noxon, Tenafly, N.J.
[73] Assignee: Thorn-Bendix Limited, New Barnet, Hertfordshire, England
[22] Filed: Sept. 10, 1969
[21] Appl. No.: 856,565

[30] Foreign Application Priority Data

Sept. 13, 1968 Great Britain......................43,781/68

[52] U.S. Cl..................................356/4, 356/205, 343/5 LS, 343/5 W
[51] Int. Cl.......................................G01c 3/08, G01n 21/22
[58] Field of Search................343/5 GC, 5 W, 117, 13, 5 LS; 356/4, 205

[56] References Cited

UNITED STATES PATENTS

| | | | |
|---|---|---|---|
| 3,175,214 | 3/1965 | Ramsay et al. | 343/13 |
| 3,316,548 | 4/1967 | D'Amico | 343/117 |
| 3,510,225 | 5/1970 | Collis | 356/4 |
| 3,419,333 | 12/1968 | Towner | 356/205 |
| 3,428,814 | 2/1969 | Doonan | 356/205 |
| 3,146,293 | 8/1964 | Lesage | 356/205 |

Primary Examiner—Rodney D. Bennett, Jr.
Assistant Examiner—S. C. Buczinski
Attorney—Kemon, Palmer & Estabrook

[57] ABSTRACT

Apparatus for measuring visual range in fog comprises a transmitter which transmits a pulsed parallel beam of radiation, a receiver which measures the radiation reflected by the fog, and means for integrating the received brightness with respect to time. A measure of the visibility is derived from the integrated brightness.

13 Claims, 6 Drawing Figures

Patented March 21, 1972

MEASUREMENT OF VISUAL RANGE IN FOG

The present invention relates to the measurement of visual range in fog and is applicable especially to the provision of information for use by pilots when landing on airfield runways in fog.

The equipment at present in use for measurement of fog density on airfields comprises a standard light source and a receiver spaced from the source which measures the light received from the source and compares it with the light which would be received in the absence of fog. This equipment only gives a measure of visual range at runway level. To elevate the source and receiver above the runway would be unacceptable because they would then occupy airspace required by the aircraft. Some work has been done on the use of back scatter from a transmitted beam of radiation to determine fog density (see "Backscatter Signature Studies for Horizontal and Slant Range Visibility", Sperry Rand Research Center, Sudbury, Massachusetts, United States of America, May 1967) but so far without much success.

The present invention arises from an analysis of the factors governing visibility in fog. In what follows the following references will be referred to by number:

1. "Backscatter Signature Studies for Horizontal and Slant Range Visibility" — Sperry Rand Research Center, Sudbury, Massachusetts — May 1967.
2. "Contrast Thresholds of the Human Eye" — Blackwell, Journal of the Optical Society of America — Nov. 1946.
3. "Theory of Fog Simulation" — P.A. Noxon, Engineering Report, Feb. 26, 1968 — The Bendix Corporation, Navigation and Control Division, Teterboro, New Jersey, United States of America.
4. "A Method for Creating a Fog Illusion for In-Flight Training" — P.A. Noxon, AIAA Paper, June 1967.

It is generally recognized that one's ability to see a given object depends on three parameters: (1) the angular size of the object, (2) the adaptation brightness, and (3) the contrast ratio (defined as the difference in brightness between the object and its background divided by the background brightness). This matter is covered in detail in Reference No. 2.

The presence of fog in the line of sight affects both the apparent brightness of the object, by attenuation, and the brightness of the background by the reflection of daylight and other ambient light by the fog particles (the backscatter).

In Reference No. 3, there is developed an equation covering the relationship of the parameters in daylight. (Equation 23 of Reference No. 3). This equation is as follows:

$$V = \frac{I_0 Q - I_A}{I_0 Q + I_0 F (e^{ax} - 1)} \quad (1)$$

where
$V$ = contrast ratio
$I_o$ = ambient light value
$I_A$ = brightness of object (assumed to be self-luminous)
$Q$ = albedo or reflectance coefficient of terrain surrounding object (e.g., grass)
$F$ = albedo or reflectance of fog
$x$ = distance in feet along line of sight between eye and object
$a$ = fog density coefficient As previously mentioned, the liminal or extinction value of $V$ depends on object size, and adaptation brightness (probably closely represented by $I_o$ in Equation (1)). It is probably not really known what this liminal value is for the pilot's situation. He is not concerned with recognizing a single known object under test condition, but rather deriving reliable guidance from a visual scene. This must be studied further, of course, but we can only assume that for a given airfield, some definite value exists at a given value of $I_o$ which can be measured. This specific value of $V$ must also inescapably include the local pertinent values of $Q$, as well as the arrangement and relative brightness of the runway lights.

The fog density coefficient $a$, which appears both in attenuation and backscatter computations (see Equations (4) and (5) in Reference No. 3) represents the equivalent projected area of the fog particles per unit area per lineal foot along the line of sight. While only a homogeneous fog structure was considered in Reference No. 3, where $a$ would be a constant, a more flexible treatment is possible. (See Reference No. 4.) In that paper, it was shown that one could assume $a$ to be some function of $x$ such as $a = f(x)$. The integration involved in solving the basic differential equation can then be indicated instead of completed, in which case the term $$e^{ax} = e^{\int f(x) dx}.$$

Equation (1) then becomes:

$$V = \frac{I_0 Q - I_A}{I_0 Q + I_0 F (e^{\int f(x) dx} - 1)}. \quad (2)$$

It is not necessary, then, to know the details of the fog structure along the line of sight to evaluate any of the fog equations, including (2) above, but only the value of the total integral $$\int f(x) dx.$$

This is a basic principle which we shall employ in the system to be described.

COMPUTATION FOR LIMINAL VALUE OF $$\int f(x) dx.$$

Solving Equation (2) for $$e^{\int f(x) dx}$$

$$VI_0 Q + VI_0 F e^{\int f(x) dx} - VI_0 F = I_0 Q - I_A$$

$$e^{\int f(x) dx} = \frac{1}{VF} \left( Q - \frac{I_A}{I_0} \right) + 1 - \frac{Q}{F}. \quad (3)$$

For any given situation, all quantities on the right-hand side of Equation (3) are known or can be directly measured, thus a liminal value of $$e^{\int f(x) dx}$$

and hence $$\int f(x) dx$$

can be determined. Let us lump these terms and assign $Z_{lim}$ to represent them $$Z_{lim} = e^{\int f(x) dx}$$

or $$\int f(x) dx = \log_e Z_{lim}. \quad (4)$$

This is the value of $$\int f(x) dx$$

which provides extinction for that particular airport, condition of ambient light, etc.; and it is the task of the fog-measuring element of the system to evaluate this term.

It will be shown in what follows that $$\int f(x) dx$$

is a function of the brightness at the receiver integrated with respect to time after transmission of a short pulse. Moreover, it is possible to determine $f(x)$ from the instantaneous value of the brightness and the integrated brightness at a time corresponding to the travel of the pulse to a distance $x$ and back. Thus visual range can be obtained either directly from the integrated brightness or indirectly by integrating the fog density $f(x)$ along the line of sight.

In accordance with the invention, therefore, there is provided apparatus for measuring visual range in fog comprising a transmitter for transmitting a pulsed parallel beam of radiation, a receiver for measuring the radiation reflected back along the same path by the fog, means for integrating the received brightness with respect to time, and means for deriving from the integrated brightness a measure of visibility.

The means for deriving a measure of visibility may comprise means for determining the time taken after transmission of a pulse for the integrated brightness to reach a set level. The visual range is then represented by half the distance travelled by the measuring radiation in the said time.

The set level is a function of a number of parameters, some of which are constant for a given location and some of which vary with fog conditions and have to be separately measured. These parameters are the extinction value of the contrast ratio $V$, the albedo or reflectance coefficient $Q$ of the terrain surrounding an object, the albedo $F$ of the fog, the brightness $I_A$ of the object, the ambient light value $I_o$, the albedo of the fog for the measuring radiation $F_m$, the brightness $I_T$ of the transmitter, and the pulse length $vp$. The extinction value of $V$, that is to say the value at which the object is no longer visible to the observer, is dependent on the size of the object and the adaptation of the observer's eye to ambient light. In the application of the invention to measurement of fog conditions on airfield runways it will also be necessary to take into account the fact that the aircraft pilot wishes to be able not merely to see a test object but to derive reliable guidance from the objects he is able to see on the ground. For this reason the effective extinction value of $V$ may be higher. Under any given ambient light conditions an appropriate extinction value of $V$ can be set into the equipment, if necessary by the use of empirically determined values.

Alternatively the means for deriving a measure of visibility may comprise means for calculating the fog density $f(x)$ at various distances $x$ from the instantaneous values of the brightness and the integrated brightness at a time corresponding to the receipt of reflected radiation from the distance $x$. When the fog density has been determined in three dimensions by the use of several transmitter/receiver units the visual range can be determined by the apparatus for any given line of observation by computing $$\int f(x) dx$$

and comparing it with the limiting value $\log_e Z_{lim}$, which is dependent on the parameters set out above.

The radiation beam may have whatever frequency is most convenient in any particular case. As an example, the present specification will describe apparatus using light generated by a laser since this facilitates the production of a collimated beam, but it may also be possible, for instance, to use a radar beam.

The use of a beam of white light for measurement is desirable since this corresponds more accurately with the actual conditions of observation than the use of radiation at a single frequency. The pulses should be very short, with a length of the order of 10 nano-seconds.

We shall now show the relationship between $$\int f(x) dx$$

and the time integral of the received brightness for a system using a collimated beam for transmission and reception, taking into account only a single reflection from the fog particles. Let:

$v$ = velocity of light
$t$ = time
$p$ = pulse length
$\therefore vp$ = pulse length
$x_1$ = distance along collimated beam $I_T = vt/2$ where $t$ is time of arrival of reflected pulse
$I_T$ = brightness of transmitter
$I_1$ = brightness at fog element
$I_2$ = brightness at fog element after reflection
$I_R$ = brightness at receiver
$F_m$ = albedo or reflectance of fog for the measuring radiation
$f(x_1)$ = fog density coefficient Now:

$$I_1 = I_T e^{-\int f(x_1)dx} = I_T e^{-\int f\left(\frac{v}{2}t\right)dt} \tag{5}$$

$$I_2 = I_1 F_m f(x_1) vp \tag{6}$$

$$I_2 = I_T F_m vp e^{-\int f\left(\frac{v}{2}t\right)dt} f\left(\frac{v}{2}t\right) \tag{7}$$

$$I_R = I_2 e^{-\int f(x_1)dx} = I_2 e^{-\int f\left(\frac{v}{2}t\right)dt}$$

$$I_R = I_T F_m vp e^{-2\int f\left(\frac{v}{2}t\right)dx} f\left(\frac{v}{2}t\right). \tag{8}$$

This is instantaneous received pulse amplitude. Let $L_R$ = time integral of return, or $$L_R = \int_0^t I_R dt$$

$$L_R = -\frac{F_m I_T vp}{2} \int_{0^-}^{t} e^{-2\int f\left(\frac{v}{2}t\right)dt} (-2) f\left(\frac{v}{2}t\right) dt \tag{9}$$

$$L_R = \frac{I_T F_m vp}{2} \Big|_{0^-}^{t} e^{-2\int f\left(\frac{v}{2}t\right)dt}$$

$$L_R = \frac{I_T F_m vp}{2} \left(1 - e^{-2\int f\left(\frac{v}{2}t\right)dt}\right) \tag{10}$$

or $$e^{-2\int f\left(\frac{v}{2}t\right)dt} = 1 - \frac{2L_R}{I_T F_m vp} \tag{11}$$

but $$\int f\left(\frac{v}{2}t\right)dt = \int f(x_1) dx_1$$

$$\therefore e^{-2\int f(x_1)dx_1} = 1 - \frac{2L_R}{I_T F_m vp} \tag{12}$$

$$\int f(x_1) dx_1 = \tfrac{1}{2} \log_e \frac{1}{\left[1 - \frac{2L_R}{I_T F_m vp}\right]}$$

or more simply, since $I_T$ and $vp$ are constants for the system $$\int f(x_1) dx_1 = \tfrac{1}{2} \log_e \frac{1}{\left[1 - K\left(\frac{L_R}{F_m}\right)\right]}. \tag{13}$$

If now the system be organized so that the optical path employed by the instrument is the same as that for the pilot's line of sight; or, $$\int f(x_1) dx_1 = \int f(x) dx,$$

we can equate the R.H. sides of Equations 4 and 13 thus:

$$\tfrac{1}{2} \log_e \frac{1}{\left[1 - K\left(\frac{L_R}{F_m}\right)\right]} = \log_e Z_{lim} \tag{14}$$

$$Z^2_{lim} = \frac{1}{\left[1 - K\left(\frac{L_R}{F_m}\right)\right]}$$

$$Z^2_{lim} - Z^2_{lim} K\left(\frac{L_R}{F_m}\right) = 1$$

$$Z^2_{lim} - 1 = \frac{Z^2_{lim} K L_R}{F_m}$$

$$L_R = \frac{F_m (Z^2_{lim} - 1)}{Z^2_{lim} K}. \tag{15}$$

The terms on the right-hand side of Equation (15) are either constants for the particular situation or else measurable parameters and can thus be set into the apparatus. When $L_R$ reaches the value represented by the Equation (15) The time $t$ over which the received brightness has been integrated represents the time for light to travel to the limit of the visual range and return and is thus a direct measure of the visual range.

The apparatus can include a gate adjustable to operate at different times relative to the transmitted pulse to cut off the return signal when the integrated brightness reaches the set level. The gate is conveniently controlled by a difference signal derived from comparing the integrated brightness with the set level, the latter being subject to variation as ambient light and other conditions change. The time of operation of the gate then continuously represents the visual range.

The apparatus is set up on the ground and can measure the visual range in whatever direction it is pointing. On an airfield it is required to predict what will be the runway visual range, that is to say the distance the pilot can see along the runway, for various altitudes of the aircraft on the glide slope. If the visual range $x$ is measured by the apparatus when inclined upwards at an angle $\phi$ then an aircraft having these co-ordinates relative to the apparatus will just be able to see the part of the runway where the apparatus is situated. The aircraft altitude $h$ is equal to $x \sin \phi$ and the runway visual range V.R. is equal to $x \cos \phi$. If the aircraft is on a glide slope of angle $\theta$ which intersects the runway at a point distance D from the apparatus it can be shown that $$x = (D \tan \theta)/(\sin \phi - \tan \theta \cos \phi). \qquad (16)$$

By varying $\phi$ this equality can be satisfied for the measured value of $x$ and $h$ and V.R. can be determined by resolving $x$.

Thus by installing a number of sets of such apparatus at intervals along the runway information can be obtained of the altitude and visual range at various points along the glide slope.

Practical embodiments of the invention are shown in the drawings, in which.

Figure 1:
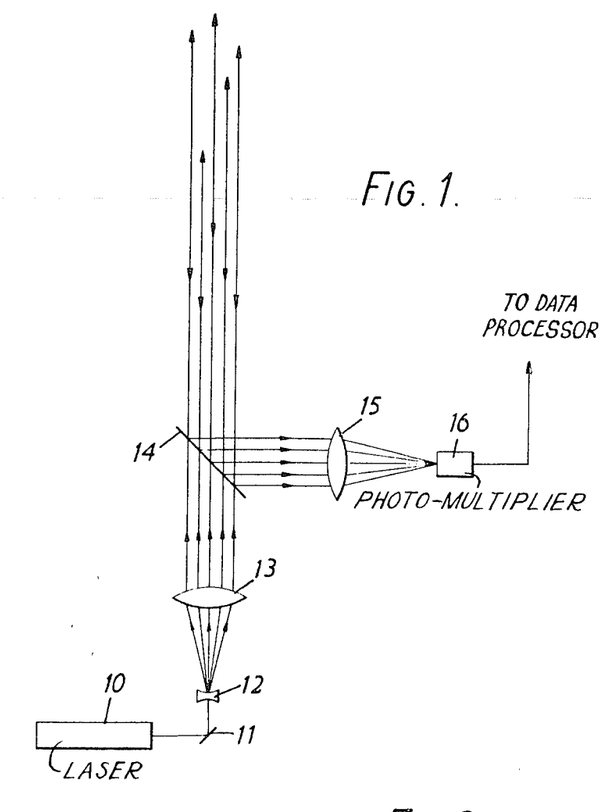
FIG. 1 is a diagram of a transmitter/receiver unit.

In the unit shown in FIG. 1 a laser 10 generates a pulsed beam which is formed by a mirror 11 and lenses 12 and 13 into a broad parallel beam which is transmitted into the fog. A beam splitter 14 is positioned to receive radiation reflected back along the transmission path and to direct this radiation by way of a lens 15 onto a photomultiplier 16 whose output is applied to the data processor.

Figure 2:
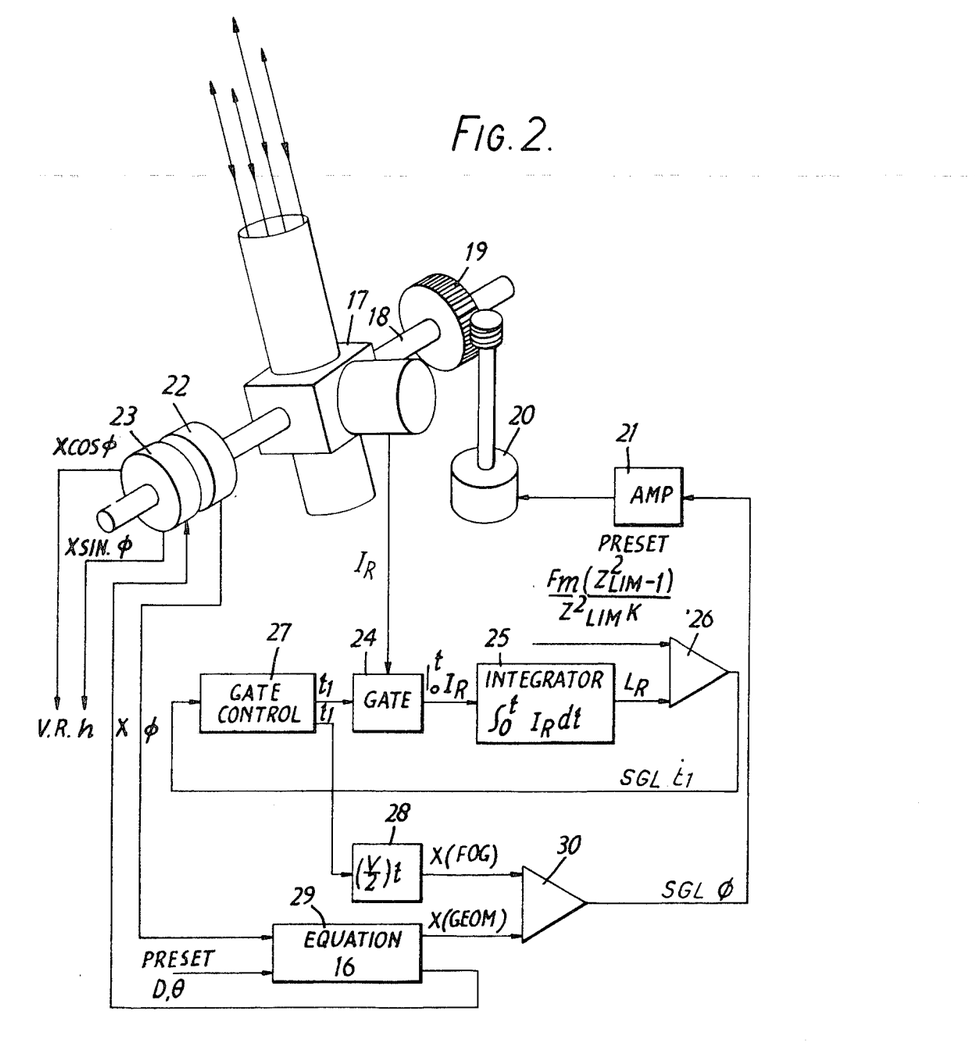
FIG. 2 shows the mounting of the transmitter/receiver unit and a block circuit diagram of a data processor for determining aircraft altitude $h$ and runway visual range V.R.

In FIG. 2 the unit of FIG. 1 is shown at 17 and is mounted on a horizontal shaft 18 carried by trunnions (not shown). The shaft 18 is rotatable through gearing 19 by means of a motor 20 which receives an input from a servo amplifier 21 and adjusts the angular position of the unit 17 accordingly. This angular position $\phi$ is measured by a transducer 22 on the shaft 18 which supplies a signal representing $\phi$ to the data processor. The latter also receives the output $I_R$ of the photo multiplier 16 of the unit 17. A resolver 23 on the shaft 18 receives a signal representing $x$ and generates $x \cos \phi = V.R.$ and $x \sin \phi = h$.

The data processor includes a gate 24 through which the signal $I_R$ passes to an integrator 25. The output $L_R$ of the integrator is compared with $$\frac{F_m(Z^2_{\lim} - 1)}{Z^2_{\lim} K}$$

by a comparator 26 and the resulting difference signal is applied by a gate control circuit 27 to close the gate 24 when the difference falls to zero. The gate control circuit supplies a signal $t_1$ representing the time of gate closure, to a multiplier circuit 28 generating an output representing visual range $x = (V/2)$ along the line of sight of the transmitter/receiver unit 17.

A circuit 29 calculates a value of $x$ by Equation (16) from preset values of D and $\theta$ and the instantaneous value of $\phi$ from the transducer 22. A comparator 30 derives a difference signal from the outputs of the two circuits 28 and 29, which is applied through the amplifier 21 to the motor 20 to adjust $\phi$ until the value of $x$ representing the visual range from the unit 17 corresponds with the geometrical conditions for an aircraft on a particular glide path. The outputs of the resolver 23 then give an altitude of the aircraft and a corresponding runway visual range.

To obtain information on visual range at a fixed altitude, the expression $x = h/\sin \phi$ replaces Equation (16) and the block circuit for generating $x$ from the geometrical conditions is modified to handle a preset input $h$ in place of D and $\theta$. By changing $h$ sequentially information can be gathered over a range of altitudes.

In the system which we have described so far, the assumption has been made that the radiant energy used for measurement be directed along the pilot's line of sight. It would thus strike directly into his eyes, if he happened to look in the direction of the ground equipment at the moment it was searching his altitude. While this would be tolerable if a non-hazardous part of the spectrum, such as K-band, be employed, it would place serious restriction on the use of visible light, which might be desirable for other reasons, since a laser sufficiently powerful to penetrate the required distance could in some circumstances destroy his eyesight.

There is, fortunately, a possibility of mitigating these difficulties, by directing the measuring beam straight upward at all times, and employing resolution techniques to obtain the required data. This orientation of the beam is much less hazardous, since it is almost impossible in normal circumstances to look straight down from an airplane.

For this purpose, we must assume that while the fog can have random structure vertically, it is laterally isotropic; i.e., perfectly stratified. Such a structure is, in fact, well approximated at times in nature, especially during conditions of low fog. Consider FIG. 3.

Figure 3:
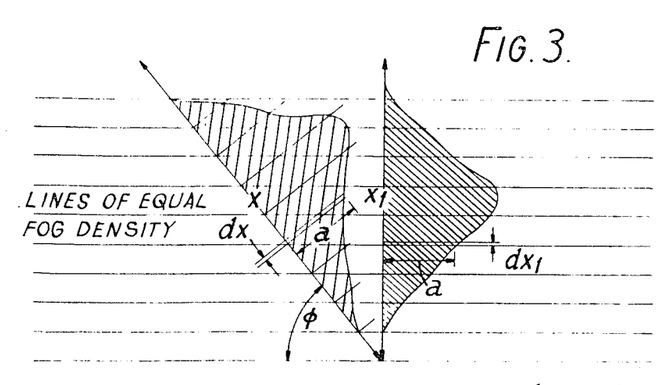
FIG. 3 is a diagram illustrating the use of a vertically directed transmitter/receiver unit and resolution along the line of sight in a stratified fog.

Consistent with our previous nomenclature, $x_1$ is the distance along the line of measurement, in this case vertically, and $x$ is the distance along the line of sight. Let the vertical structure be random, such that, as previously considered, we let $a$, the density coefficient, be a function of $x_1$ or $$a = f(x_1).$$

Now $$x = (x_1)/(\sin \phi) \qquad (17)$$
$$\therefore dx = (dx_1)/(\sin \phi). \qquad (18)$$

According to our assumptions, the fog density coefficient $a$ is the same for each corresponding point on $x_1$ and $x$, thus the respective area elements will be proportional to the above ratio.

i.e., $$adx = (adx_1)/(\sin \phi). \qquad (19)$$

Clearly $$\int adx = \int f(x) dx \text{ (the area on } x\text{)}, \qquad (20)$$

but $$a = f(x_1)$$

$$\therefore \int f(x_1) dx_1 = \int adx_1 \text{ (the area on } x_1\text{)}. \qquad (21)$$

Substituting:

$$\int f(x) dx = \frac{1}{\sin \phi} \int f(x_1) dx_1. \qquad (22)$$

We are therefore at liberty to take our measurements in a vertical direction and resolve to the pilot's line of sight. To the degree that the fog departs from an isotropic structure, the result will, of course, be in error. Since, as mentioned previously, many fogs approximate this form, and in any case a number of measuring elements, distributed about the area, will be employed, it seems a worthwhile trade-off to take in view the many advantages associated with this arrangement. We should include the fact that since the measuring light will, in general, travel a shorter distance, a smaller amount of power may suffice — conversely, at the same power level, better resolution can be had. Now Equation (17) states that:

$$x = (x_1)/(\sin \phi).$$

Also Equation (22):

$$\int f(x)dx = \frac{1}{\sin \phi} \int f(x_1)dx_1.$$

Also Equation (4):

$$\int f(x_1)dx = \log_e Z_{\lim}$$

$$\therefore \int f(x_1)dx_1 = \sin \phi \log_e Z_{\lim}. \quad (23)$$

Rewriting Equation (14) (let $L_{R_1} = L_R$ along $x_l$)

$$\frac{1}{2} \log_e \frac{1}{\left[1 - K\left(\frac{L_{R_1}}{F_m}\right)\right]} = \sin \phi \log_e Z_{\lim} \quad (24)$$

$$Z_{\lim}^{2\sin\phi} = \frac{1}{\left[1 - K\left(\frac{L_{R_1}}{F_m}\right)\right]} \quad (25)$$

$$L_{R_1} = \frac{F_m(Z_{\lim}^{2\sin\phi} - 1)}{Z_{\lim}^{2\sin\phi} K}. \quad (26)$$

The resolution angle $\phi$ is now represented by a quantity stored somewhere in the computer rather than the physical position of anything. Let us, for convenience, consider it the independent variable. Starting with $\phi=90°$, $L_{R_1}=L_{R_1}$ in Equation (15) since $\sin \phi = 1$. This is compared, as before, with the liminal value according to Equation (15), and if insufficient, $\phi$ is programmed to a smaller value. It is necessary now to continuously recompute the liminal value of $L_{R_1}$ by means of Equation (26). Eventually, a point will be found where the measured value of $L_R$, and the computed value for the value of $\phi$ involved will be equal. Also, $h$ and $V.R.$ can then be read out as before.

Figure 4:
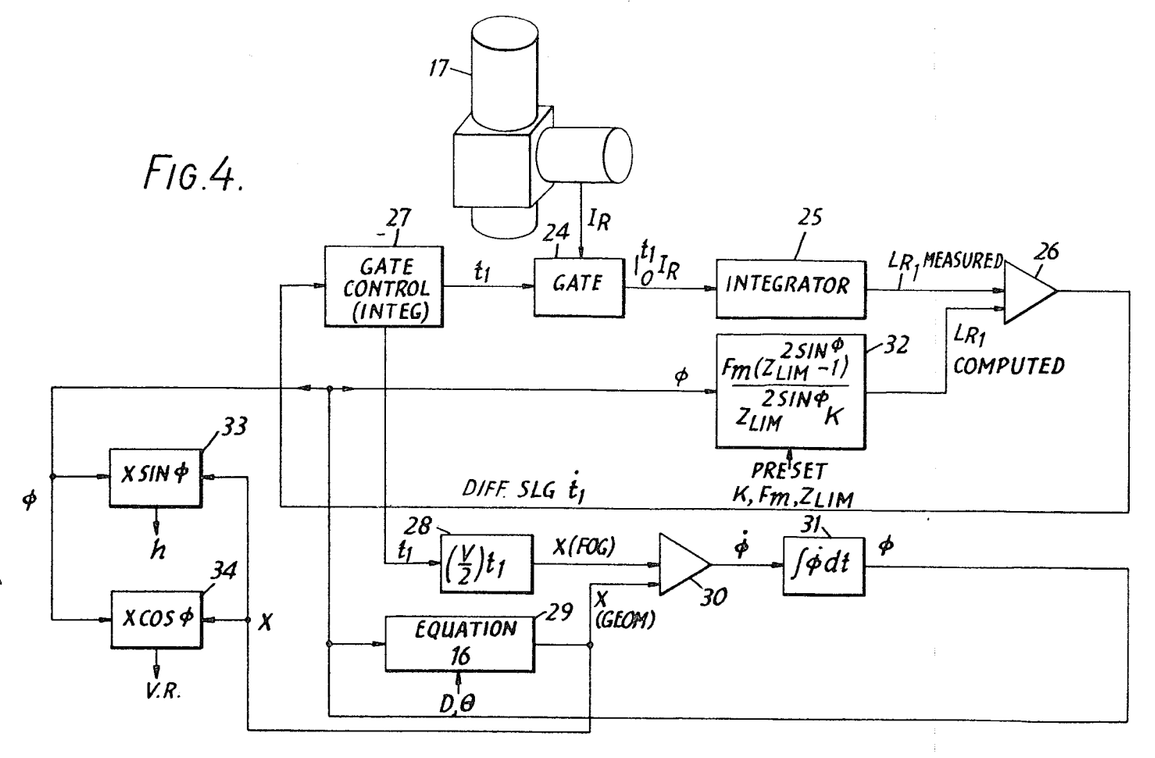
FIG. 4 is a block diagram of a data processor employing the resolution technique illustrated by FIG. 3.

Suitable apparatus for effecting the computation is shown in FIG. 4, which is a schematic drawing similar to FIG. 2 but with the modifications necessary for effecting resolution of the measurements onto a line of observation at an angle $\phi$ to the horizontal.

Parts corresponding to those of FIG. 2 are given the same reference numerals and will not be further described. The unit 17 is no longer swingably mounted but is fixed to look vertically upwards. The output of the comparator 30 is therefore not applied to control the position of the unit 17 but is applied to an integrator 31 which generates a signal representing the angle $\phi$. This signal forms the input to the circuit 29 which in FIG. 2 was derived from the transducer 22. It also forms one input of a logic unit 32 which computes $$L_{R_1} = \frac{F_m(Z_{\lim}^{2\sin\phi} - 1)}{Z^{2\sin\phi} K}$$

for comparison in the comparator 26 with the measured value of $L_{R_1}$. The value of $\phi$ is automatically adjusted until it complies with the geometrical conditions and values of altitude $h$ and runway visual range $V.R.$ are then given by logic units 33 and 34, respectively, which compute $x \sin \phi$ and $x \cos \phi$, respectively.

The apparatus of FIG. 4 can be modified in a similar manner to that of FIG. 2 to provide measurements at set altitudes. As before a number of such apparatus would be distributed about the airfield to build up a three-dimensional picture of the fog conditions likely to be encountered by a pilot during landing.

It will now be shown that the transmitter/receiver unit 17 can be used to determine actual values of the fog density $f(x)$ and thus by use of several units distributed over the airfield and directed vertically it is possible to build up a map of the fog density distribution in three dimensions. As a result it is not necessary to rely on assumptions as to the stratification of the fog in computing visual ranges since $$\int f(x)dx$$

can be computed for any line of sight.

For this purpose we write Equation (8) above in terms of distance $x$:

$$I_R = I_T F_m v p f(x) e^{-2\int_0^x f(x)dx} \quad (27)$$

Thus $$L_R = \int_0^x I_R dx = I_T F_m v p \int_0^x f(x) e^{-2\int_0^x f(x)dx} \quad (28)$$

$$= \frac{1}{2} I_T F_m v p \Big|_0^x - e^{-2\int_0^x f(x)dx}$$

$$= \frac{1}{2} I_T F_m v p - \frac{1}{2} I_T F_m v p e^{-2\int_0^x f(x)dx} \quad (29)$$

Now by inspection of Equation (27)

$$I_T F_m v p e^{-2\int_0^x f(x)dx} = \frac{I_R}{f(x)},$$

and hence by substitution $$L_R = \frac{1}{2} I_T F_m v p - \frac{I_R}{2f(x)}. \quad (30)$$

Solving for $f(x)$ we have $$f(x) = \frac{I_R}{I_T F_m v p - 2L_R}. \quad (31)$$

Thus the fog density at a distance $x$ from the transmitter/receiver unit is determinable from the received brightness $I_R$ at the instant corresponding to receipt of radiation reflected from that distance and the integrated value $L_R$ of that brightness at the same instant. By determination of $f(x)$ for various distances it is possible to build up a picture of the vertical distribution of fog density above a vertically directed transmitter/receiver unit. Thus by the use of an array of vertically directed units the overall fog distribution can be determined.

Figure 5:
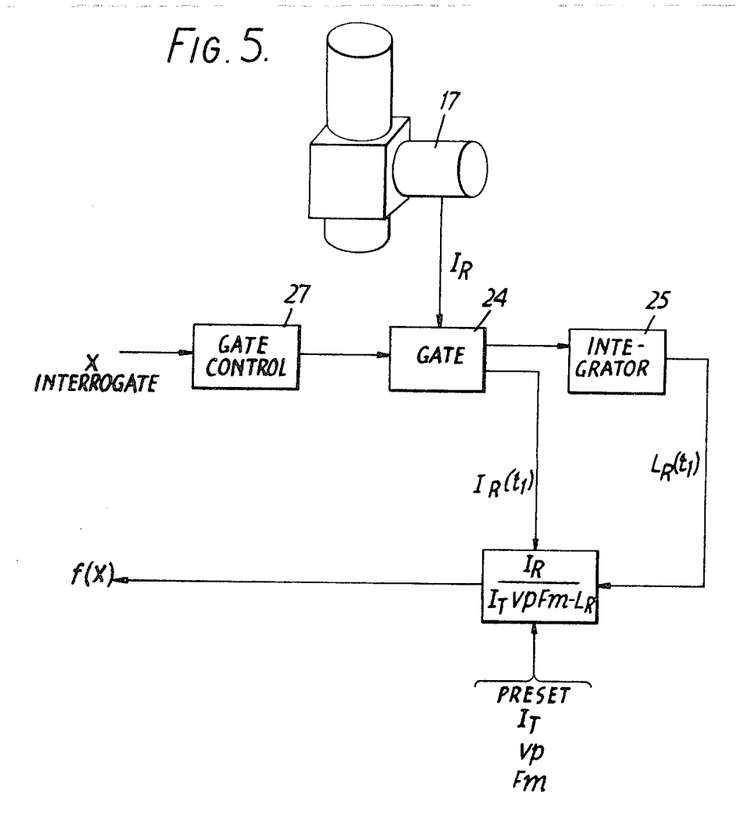
FIG. 5 is a block diagram of a data processor for determining $f(x)$

FIG. 5 shows the data processer associated with one of an array of units which are connected to a central computer which by interrogation obtains values of $f(x)$ from the various units to build up the overall distribution. The output $I_R$ from the unit 17, as before, passes through the gate 24 to the integrator 25. The gate is controlled by the gate control circuit 27 which in this case receives interrogation signals from the central computer representing a particular value of $x$. The gate is accordingly closed at the corresponding instant $t_1$ to give a value of $L_R(t_1)$ at the output of the integrator 25 and a value of $I_R(t_1)$ at the output of the gate 24. These are passed to a logic unit 35 which also receives preset values of $I_T$, $vp$, and $F_m$ and computes $f(x)$ for transmission to the computer.

The data can be processed in various ways by the computer in order to obtain runway visual range for any position of an aircraft. It is possible, for example, for the computer to store data representative of the fog density distribution from which $$\int f(x)dx$$

can be obtained for any given line of sight. Then for any given height on a particular glide path $$\int f(x)dx$$

can be calculated for lines of sight at various angles and compared with $\log_e Z_{lim}$ to find the runway visual range.

Figure 6:
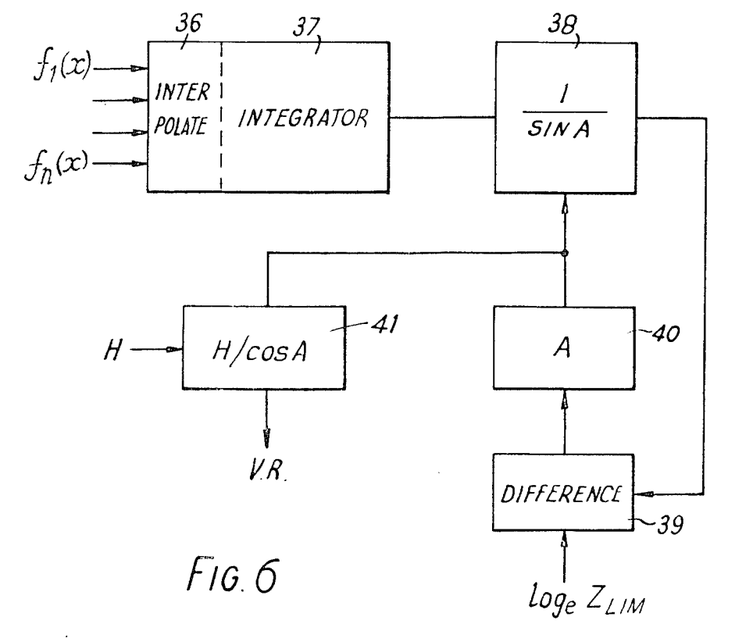
FIG. 6 is a logic diagram for calculating the runway visual range V.R. at various heights H on a glide path.

By way of example FIG. 6 shows a logic diagram for a computer for calculating the runway visual range V.R. at various heights H on a glide path from information as to fog density received from a number of units spaced at equal intervals along the ground below the glide path. The outputs of the various units are represented by $f_1(x), f_2(x) \ldots f_n(x)$. Distance along the ground is represented by R and the distance between units by $\Delta R$. The integrated fog density in a horizontal direction is approximated to by the expression $$\sum_1^n (f_1(x) + f_2(x)) \frac{\Delta R}{2}.$$

This is obtained by means of an interpolator 36 and an integrator 37. It is then resolved to the line of sight by multiplying by 1/sin A in the block 38, the angle A being that between the chosen line of sight and the vertical. The output from 38 is applied to a difference circuit 39 which also receives $\log_e Z_{LIM}$ and generates a difference signal which is applied to a circuit 40 to adjust A until the difference is reduced to zero. The output from 40 representing the angle A, in addition to being supplied to the block 38 is fed to a second multiplier 41 to convert an input height H into the corresponding runway visual range V.R. for the prevailing fog density conditions.

What I claim is:

1. Apparatus for measuring visual range in fog comprising:
   a transmitter for transmitting a pulsed parallel beam of radiation;
   a receiver for measuring the radiation reflected back along the same path by the fog;
   means for determining the mathematical integral of the received brightness at any instant over a time period which period is of the order of several times the pulse length; and
   means for deriving from the integrated brightness a measure of visibility.

2. Apparatus as claimed in claim 1 wherein the means for deriving a measure of visibility comprise means for determining the time taken after transmission of a pulse for the integrated brightness to reach a set level.

3. Apparatus as claimed in claim 2 having a gate coupling the integrating means to the receiver, a gate control circuit, and a comparator comparing the output of the integrating means with the set level and supplying a difference signal to the gate control circuit whereby the control circuit closes the gate when the set level is reached and generates an output representing the time of gate closure.

4. Apparatus as claimed in claim 3 including a second comparator which compares the output of the gate control circuit with a reference signal from a reference circuit which is a function of aircraft position and of the elevation angle $\phi$ of the line of observation, the output of the second comparator being applied to vary $\phi$ until the line of observation coincides with the line of sight of the aircraft.

5. Apparatus as claimed in claim 4 in which the transmitter/receiver unit is swingable about a horizontal axis by a servomotor to adjust the angle of elevation, the output of the second comparator being applied to the servomotor.

6. Apparatus as claimed in claim 2 which the transmitter/receiver unit is mounted to observe in a vertical direction and the set level is a function of the angle of elevation $\phi$ of a desired line of observation.

7. Apparatus as claimed in claim 4 in which the transmitter/receiver unit is mounted to observe in a vertical direction and the output of the second comparator is integrated to provide a signal representing a changing $\phi$ which is applied to the reference circuit and to a level circuit generating the set level.

8. Apparatus as claimed in claim 6 in which the set level is given by $$\frac{F_m(Z_{lim}^{2\sin\phi} - 1)}{Z_{lim}^{2\sin\phi} K}.$$

9. Apparatus as claimed in claim 4 in which the reference circuit is supplied with co-ordinates of aircraft position $\theta$ representing the angle of the glide slope and D representing the distance from the apparatus at which the glide slope intersects the runway and operates to determine the visual range
$$x = (D \tan \theta)/(\sin \phi - \tan \theta \cos \phi).$$

10. Apparatus as claimed in claim 4 in which the reference circuit is supplied with aircraft altitude h and operates to determine visual range $x = h/\sin \phi$.

11. Apparatus as claimed in claim 13 in which the means for deriving a measure of visibility comprise means for computing the fog density $f(x)$ at various ranges $x$ from the instantaneous value of the brightness $I_R$ and the integrated brightness $L_R$ at the instant corresponding to receipt of reflected radiation from the distance $x$ in accordance with the formula
$$f(x) = (I_R)/(I_T F_m vp - 2L_R).$$

12. Apparatus as claimed in claim 13 having a plurality of transmitter/receiver units coupled to a central computer.

13. A method of determining visual range in fog comprising the steps of transmitting a pulsed parallel beam of radiation, detecting the radiation reflected back along the same path by the fog,
   integrating the brightness of the detected radiation over a time period which is of the order of several times the pulse length,
   and deriving from the magnitude of the integrated brightness a measure of visibility.

* * * * *